United States Patent
Siu et al.

(10) Patent No.: US 7,854,194 B2
(45) Date of Patent: Dec. 21, 2010

(54) JUICER SPEED CONTROL

(75) Inventors: Eddie Siu, Botany (AU); Keith James Hensel, Botany (AU)

(73) Assignee: Breville Pty Limited, Botany, New South Wales (AU)

( * ) Notice: Subject to any disclaimer, the term of this patent is extended or adjusted under 35 U.S.C. 154(b) by 371 days.

(21) Appl. No.: 11/854,548

(22) Filed: Sep. 13, 2007

(65) Prior Publication Data
US 2008/0066630 A1    Mar. 20, 2008

(30) Foreign Application Priority Data
Sep. 15, 2006    (AU) .............................. 2006905106

(51) Int. Cl.
*A47J 19/02*    (2006.01)
(52) U.S. Cl. .......................................... 99/510; 99/485
(58) Field of Classification Search .................. 99/510, 99/485
See application file for complete search history.

(56) References Cited

U.S. PATENT DOCUMENTS

| | | | | |
|---|---|---|---|---|
| 5,819,636 | A * | 10/1998 | Khashoggi | 99/326 |
| 6,364,522 | B2 * | 4/2002 | Kolar et al. | 366/206 |
| 2002/0009016 | A1 * | 1/2002 | Ancona et al. | 366/205 |
| 2002/0141286 | A1 * | 10/2002 | Wulf et al. | 366/206 |

FOREIGN PATENT DOCUMENTS

WO    WO 2005002404 A1 *    1/2005

\* cited by examiner

*Primary Examiner*—Mark H Paschall
(74) *Attorney, Agent, or Firm*—Molins & Co.

(57) ABSTRACT

A variable speed selector for a juicer is user operable for selecting a speed from a speed range. The speed range is divisible into sub-ranges. A display area is adapted to depict the selected sub-range. The display area further comprises a list of vegetables or fruit. The display area also comprises a moving indicator that moves according to the selected speed, and appears adjacent to the fruit or vegetable for which the selected speed is optimal.

14 Claims, 3 Drawing Sheets

JUICER SPEED CONTROL

FIELD OF THE INVENTION

The invention relates to speed controls and more particularly to a speed control and display arrangement for a fruit and vegetable juicer.

BACKGROUND OF THE INVENTION

Motorized fruit and vegetable juicers are well known. Most conventional domestic fruit and vegetable juicers are single speed machines although some have two or three speeds. A motorized fruit and vegetable is depicted in the applicant's PCT application PCT/AU2004/0007828.

Multi speed fruit and vegetable juicers have been developed because the rotating grader is more effective at higher speeds with harder fruits and vegetables and more effective at lower speeds with softer fruit and vegetables. However, many consumers are unaware of the relationship between motor speed and fruit or vegetable hardness. Further, fruit and vegetable juicers known in the prior art have lacked displays which assist the user in selecting the appropriate motor speed.

Motorized centrifugal juicers use a cutting disk with angled strainer basket for continuous juicing. The plant material is pushed down against the cutting disk and then forced against the angled basket. The vegetable pulp hits the angled basket and centrifugal force pulls the juice out of the shredded plant material. In order to discharge pulp from the spinning basket effectively (and for the processing of harder fruits and vegetables) this type of juicer needs to spin relatively quickly.

Although high motor speeds reduce the effort for juicing hard fruits and vegetables, higher motor speeds are unnecessary for juicing softer fruits like watermelon and citrus. Higher motor speeds are associated with increased airflow that results in leakage, as juice will tend to accompany air escaping through the gaps in the case of the juicer. In addition to leakage, increased motor speeds can also generate excess foam that sits on top of the juice and are also associated with increased noise levels.

OBJECTS AND SUMMARY OF THE INVENTION

It is an object of the invention to provide a display for a fruit and vegetable juicer that assists the user in selecting the appropriate motor speed.

It is another object of the invention to provide a display for a fruit and vegetable juicer that assists the user in selecting the appropriate motor speed and that indicates when the safety bar or other mechanical motor interlock device is enabled or disabled.

Accordingly, there is provided a variable speed control assembly for a juicer, comprising a motor speed selector. The selector is adapted to be user-operable for selecting a speed from within a continuous speed range of a motor of the juicer. The assembly further comprises a logic circuit adapted to detect a position of the selector. The logic circuit is adapted to control the motor. The assembly further has a display adapted to depict the speed of the motor.

There is further provided a display assembly for a juicer, comprising an alpha numeric display adapted to depict a selected speed of a motor of the juicer. The assembly comprises a list display adapted to depict a list of fruits or vegetables, and a graphic indicator adapted to appear adjacent to a fruit or vegetable in the list for which the selected speed is optimal.

BRIEF DESCRIPTION OF THE DRAWING FIGURES

In order that the invention is better understood, reference is now made to the following drawing figures in which.

BEST MODE AND OTHER EMBODIMENTS OF THE INVENTION

The present technology provides a variable speed controller and display for a motorized fruit and vegetable juicer. The combination allows the user to select an optimal speed according to the hardness of fruit and vegetable being juiced. In the examples provided, the speed controller is in the form of a rotary selector, dial or knob that can vary the motor's speed discretely or continuously between about 6,500 and 13,000 rpm. The controller is linked to a liquid crystal display (LCD) that provides, for example, a large numeric display indicating the selected speed range and also offering suggestions as to fruits and vegetables that can be successfully juiced at a selected speed or indicated speed. Groups or sets of fruits and vegetables may be illuminated to indicate the different varieties that can be juiced at the selected speed thus providing the highest yield for each fruit type with minimum air flow, foam and noise.

It will be appreciated that the invention contributes to the utility of a juicer by providing a user with assistance regarding the selection of an optimal or at least useful motor speed for a given food substance. The invention also provides the user with useful feedback regarding a selected speed or machine state or indented outcome. Accordingly it will be understood that the teachings of the present invention may be applied to a variety of motorized kitchen appliances such as mixers, food processors and blenders. Food stuffs other than fruits and vegetables can be included in or comprise the ordered lists, items and sets referred to in this specification.

Figure 1:
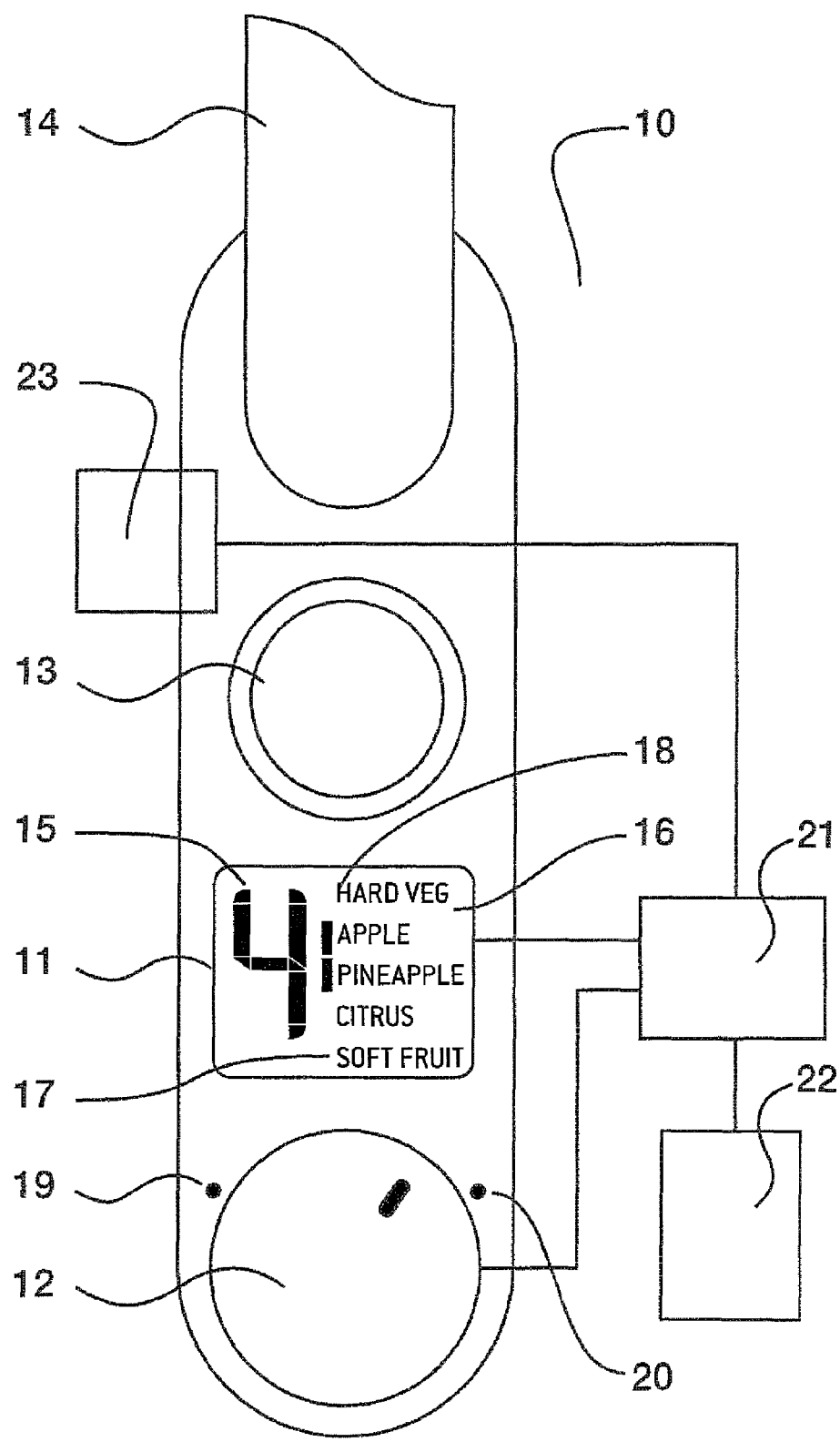
FIG. 1 is a schematic view of a fruit and vegetable juicer speed control, display and logic diagram.

FIG. 1 illustrates a control and display 10 as might be found on the outer case of a fruit and vegetable juicer of the type depicted in the aforementioned PCT application (incorporated here by reference). The display comprises an illuminated display area 11, a continuously variable speed controller 12 and an optional on-off button 13. In this particular example, the safety bar 14 of the juicer passes through the body of the juicer close to the control and display area 10. When the safety bar 14 is in the upright and locked position, the juicer's motor can be operated by the user. When the safety bar 14 is in any other position, the motor is disabled and cannot be operated.

The illuminated display area 11 comprises three principle features. In this example, an optional large multi segment single digit alpha numeric display 15 or other symbolic representation is adapted to depict an indication related to the motor speed settings selected by the user. Another area of the illuminated display 15 comprises a display area dedicated to show one or more items such as individual words or a list of items such as the names of fruits or vegetables 16 or other helpful text. In this example, the softest fruits or vegetables or the words e.g. "soft fruits" appear at the bottom of the list 17. The precise selection of words describing fruit or vegetable in the list 16 is not material to the scope of the invention. The list provides the user with an indication of typically soft and typically hard vegetables and in this embodiment, the list is pre-established in its order and cannot be changed by the user. In other embodiments, the user may be able to select which fruits or vegetables appear in the listing 16. A third area of the display 18 comprises a moving bar or other graphic indicator, pointer or designator. The moving indicator or designation changes in accordance with the position of the continuously variable speed control 12. The list in the display is ordered in accordance with the motor speed that produces the optimum juicing action. In general softer fruits and vegetables juice better at lower speeds than harder ones. However, factors such as the propensity to froth, juice content, etc. may have a role in determining the display order, i.e. where on a list a particular fruit or vegetable will appear. The designation referred to above serves to identify one or a set of two or more adjacent items (foodstuffs, fruits or vegetables or descriptive term like "soft fruit" etc.) that have been placed into a useful order, essentially by pointing. This graphic designation can also be achieved by graphically highlighting one or more items by making the designated item or items larger or brighter in the display.

In preferred embodiments, the continuously variable speed controller 12 is a variable potentiometer that can be user adjusted from a minimum speed position 19 to a maximum speed position 20. The speed control 12 may be provided with tactile feedback such as click stops which give the user some indication of the juicer motor's speed within the range of all speeds. The position of the continuously variable controller 12 is detected by a logic circuit 21 that controls the juicer's motor 22. The logic circuit 21 also detects whether or not the juicer's internal safety or micro switch 23 is open or closed in accordance with the position of the safety bar 14. The logic circuitry 21 also supplies signals to the illuminated display area 16 as will be explained.

Figure 2:
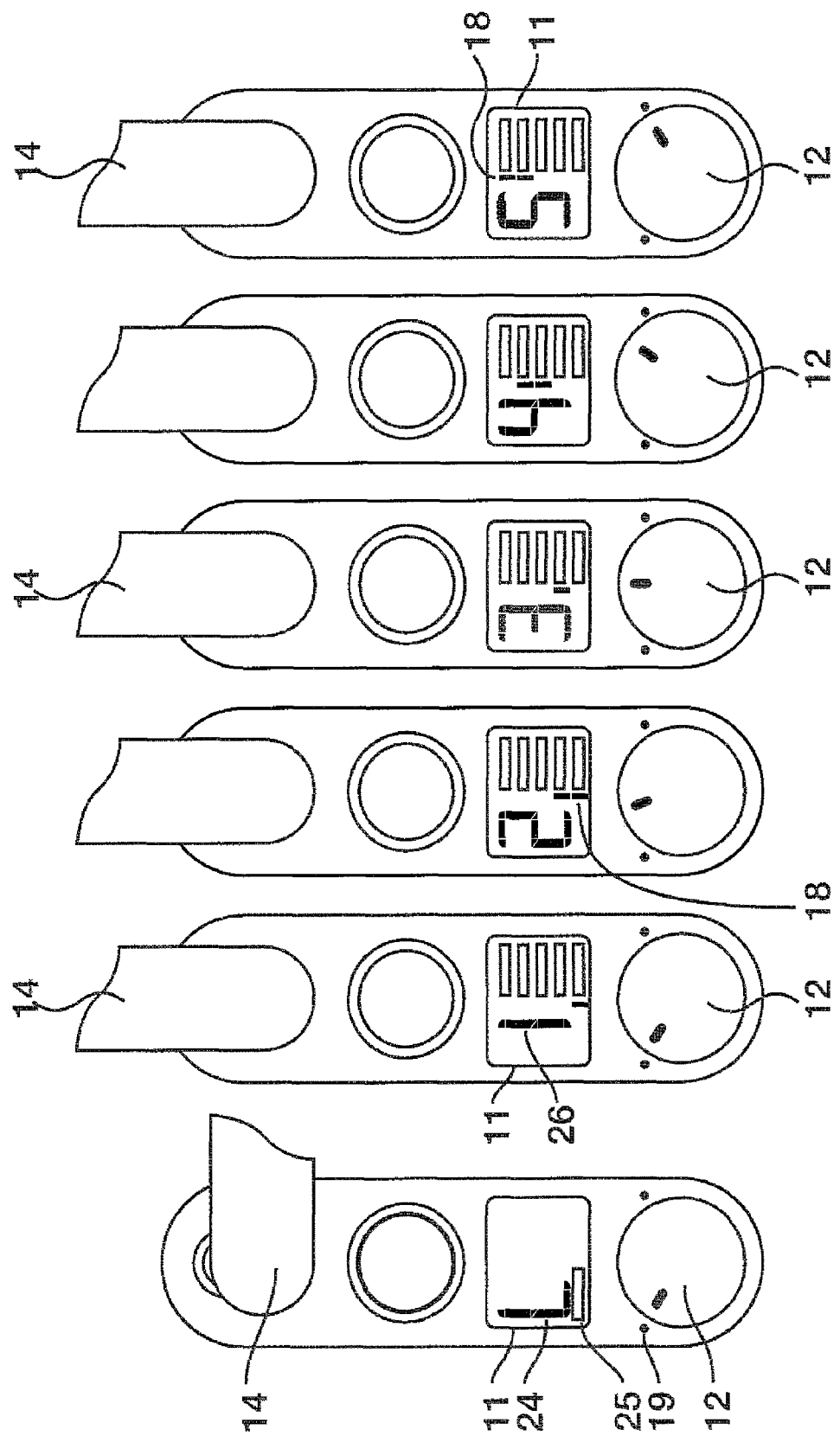
FIG. 2 illustrates the variable speed motor controller and display in six different display modes.

As shown in FIG. 2, the illuminated display area 11 changes in accordance with the position of the continuously variable speed controller 12. When the safety bar 14 is in a position other than the upright and locked position, the illuminated display area 11 displays an "L" 24 and, for example, the word "LOCKBAR" 25 may appear below the indicator 24. The presence of a message such as the indicator "L" informs the user that the lockbar is not in a position for the motor to operate. Note that in this orientation, the continuously variable speed controller 12 is set at its minimum speed position 19 and yet the juicer's motor is not rotating. With the lock bar 14 in its upright position, and the variable speed controller 12 at its minimum operational setting 19, the illuminated display area 11 displays the numeral "1" 26 and the graphic indicator 18 is adjacent to the softest fruit or vegetable in the list 16. In this example, the words "soft fruit" are used to indicate the lowest speed setting of the controller 12. As the continuously variable controller 12 is rotated in a clockwise direction, the motor speed increases. The range of speeds in this example has been subdivided into five ranges and each range is indicated by a single digit numeral 26 being the numerals 1 through 5. As the speed increases, the graphic indicator 18 may cover a set of two or more adjacent fruits or vegetables from the list 16. Note that at arbitrary or default speed setting 2, the graphic indicator 18 is present next to a default indicia, such as both "soft fruit" and "citrus". With further rotation of the continuously variable controller 12 the motor speed increases and the numeral "3" is displayed when the logic circuit 21 determines that the correct or optimal motor speed has been reached. Within this speed range, the graphic indicator 18 is adjacent to only the "citrus" text that appears in the list 16. The location of the graphic indicator 18 correlates a fruit or vegetable and the optimal juicing speed for that fruit or vegetable. Note that at the highest speed setting designated as "5" the graphic indicator 18 is adjacent the hardest vegetable in the list 16.

Thus, in the example provided, five fruits or vegetables are depicted in the list 16. The continuously variable speed control 12 also has five click-stop or detent settings that correspond with each of the five speed ranges. However, it will be appreciated that the continuously variable controller 12 still operates in between the detent settings so that the user, in effect, has a continuous range of motor speeds between the lowest setting 19 and the highest setting 20 of the controller. In other embodiments, many click stops (e.g. 50) provide tactile feedback without any particular reference to the actual numerical designation of speed setting. Different schemes may be used to indicate the actual speed by utilizing the moving graphic indicator 18 in the manner suggested by FIG. 2. Other schemes are also equally applicable to the teachings of the present invention.

Figure 3:
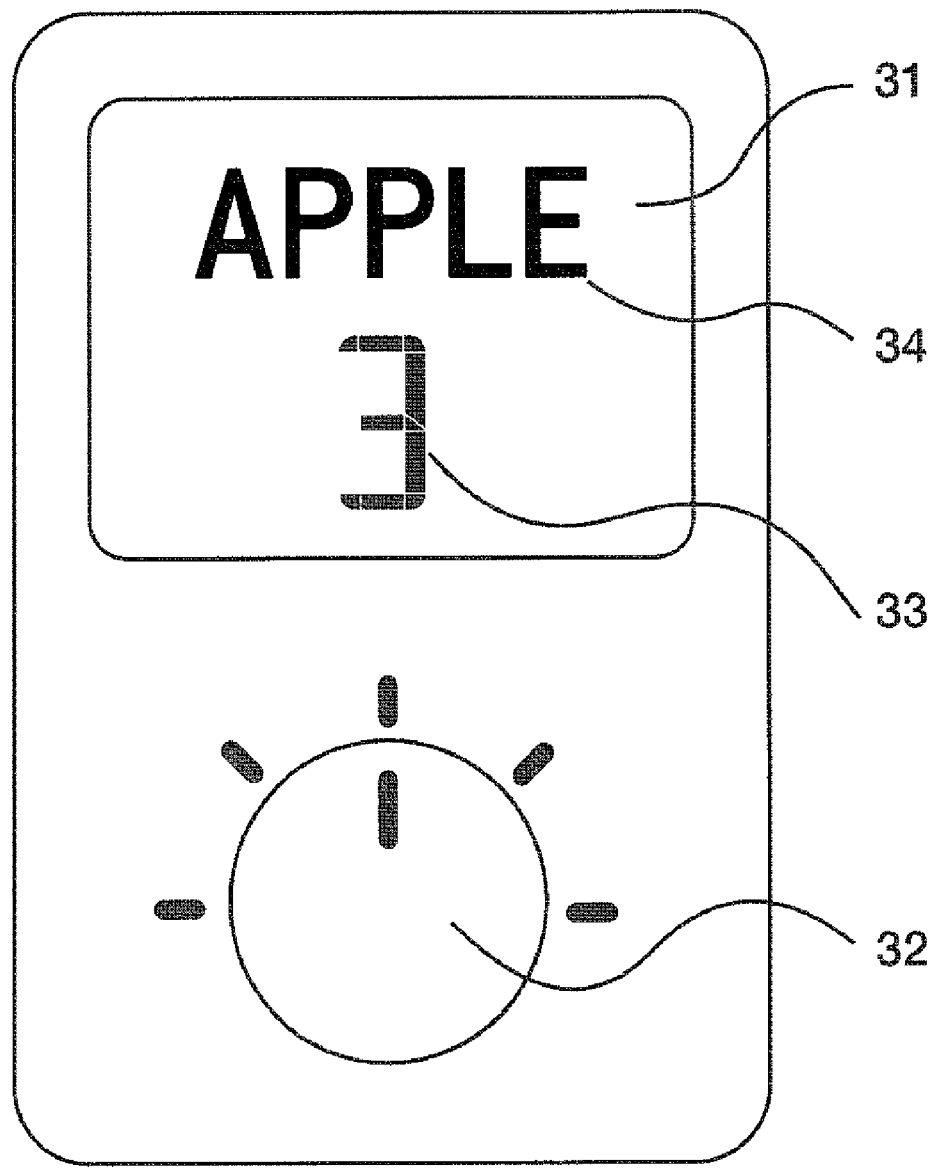
FIG. 3 illustrates another embodiment of a display

As shown in the example of FIG. 3, items in the pre-established order or list may also be designated by having them appear to the exclusion of other items. In one embodiment all of the display area allocated to depict items in the list 31 is used to display only a single item (or perhaps two items) 34 to the exclusion of other items. This allows the visual size of the item to be as large as possible within the display. Operation of the selector 32 then causes a change in motor speed accompanied by a change in the single item depicted. An optional symbol such as a numeral 33 or other indicator in a display area may be used to provide additional information about the motor setting or speed.

While the present invention has been disclosed with reference to particular details of construction, these should be understood as having been provided by way of example and not as limitations to the scope or spirit of the invention.

What is claimed is:

1. A variable speed control assembly for a juicer, comprising:
   a motor speed selector that is user-operable for selecting a speed from within a speed range of a motor of the juicer;
   a display adapted to depict a visual designation of a first vegetable or fruit from a pre-established order, the designation changeable from the first vegetable or fruit to a second vegetable or fruit in the pre-established order;
   the order based on a motor speed associated with juicing each fruit or vegetable in the list;
   the visual designation being changeable in response to the operation of the selector.

2. The assembly of claim 1, wherein:
   the designation comprises a graphic indication of a set of two or more fruits or vegetables, the set comprising the first or the second first vegetable or fruit.

3. The assembly of claim 1, wherein:
   the display also depicts an indication apart from the designation that is related to an actual motor speed.

4. The assembly of claim 1, wherein:
   the designation correlates a set of two or more fruits or vegetables that are adjacent to one another in the order.

5. The assembly of claim 1, further comprising:
   a logic circuit adapted to detect a position of the selector;
   the logic circuit being adapted to control the motor.

6. The assembly of claim 1, wherein:
   the speed range is divisible into a series of two or more sub-ranges, and the display further comprises an alpha numeric display, wherein the alpha numeric display is adapted to indicate each of the sub-range in accordance with a position of the selector.

7. The assembly of claim 1, wherein:
the selector is a rotary controller.

8. The assembly of claim 7, wherein:
the selector is provided with a tactile feedback.

9. The assembly of claim 5, wherein:
the control over the motor is a continuous control of the motor's speed.

10. The assembly of claim 1, wherein:
the juicer device comprises an internal safety switch and a user-operable safety bar, wherein the internal safety switch interrupts an operation of the juicer unless the safety bar is in a locked position.

11. The assembly of claim 10, wherein,
the display is adapted to display a warning when the safety bar is not in the locked position.

12. The assembly of claim 1, wherein:
the order is user modifiable.

13. The assembly of claim 1, wherein:
the designation comprises a default indicia.

14. The variable speed control assembly of claim 1, further comprising:
a motorized juicer to which the speed control assembly is attached, the juicer having a motor with a speed that is controlled by the selector.

* * * * *